United States Patent [19]
Grossman

[11] Patent Number: 5,777,986
[45] Date of Patent: Jul. 7, 1998

[54] METHOD AND APPARATUS FOR CONTROLLING QUALITY OF SERVICE IN AN ATM NETWORK

[75] Inventor: Daniel B. Grossman, Norwood, Mass.

[73] Assignee: Motorola, Inc., Schaumburg, Ill.

[21] Appl. No.: 698,714

[22] Filed: Aug. 16, 1996

[51] Int. Cl.[6] .................................................. H04L 12/56
[52] U.S. Cl. ........................... 370/235; 370/252; 370/397; 370/409
[58] Field of Search ........................ 370/230, 231, 370/232, 235, 282, 253, 389, 395, 396, 397, 400, 401, 409, 410, 465

[56] References Cited

U.S. PATENT DOCUMENTS

| | | | |
|---|---|---|---|
| 5,153,877 | 10/1992 | Esaki et al. | 370/389 |
| 5,291,477 | 3/1994 | Liew | 370/238 |
| 5,315,586 | 5/1994 | Charvillat | 370/396 |
| 5,485,455 | 1/1996 | Dobbins et al. | 370/255 |
| 5,487,061 | 1/1996 | Bray | 370/252 |
| 5,533,020 | 7/1996 | Byrn et al. | 370/395 |
| 5,555,265 | 9/1996 | Kakuma et al. | 370/395 |
| 5,689,499 | 11/1997 | Hullett et al. | 370/397 |

*Primary Examiner*—Alpus H. Hsu
*Attorney, Agent, or Firm*—James A. Coffing

[57] ABSTRACT

A switching node for an ATM network can selectably implement one of a plurality of call transforming procedures. The switching node stores characteristics of each connected communications link in a virtual connection and determines, for any ATM message the quality of service requirements for a particular transfer over a virtual connection. The selection of a call transferring process is based upon minimizing a particular potential error. Decisions concerning the implementation of correction procedures and the capability of the virtual connection to accommodate these requirements are made on a link-by-link basis.

26 Claims, 9 Drawing Sheets

METHOD AND APPARATUS FOR CONTROLLING QUALITY OF SERVICE IN AN ATM NETWORK

FIELD OF THE INVENTION

This invention generally relates to communications networks for transferring data between multiple locations and more particularly to a method and apparatus for improving the operation of a virtual connection in a network by controlling quality of service in an asynchronous transfer mode (ATM) network.

BACKGROUND OF THE INVENTION

A network incorporating ATM system architecture enables multiple applications like voice, data and video to be mixed over the network that comprises switching nodes and communications links. Networks for these applications generally have been designed for a particular type of application, such as teleconferencing applications. Different types of applications, however, have diverse requirements.

"Quality of Service" or "QoS" parameters in part define these requirements and include errored cell ratio (ECR), cell loss ratio, fixed delay and delay variation parameters. Applications may also indicate a set of parameters called a "traffic contract" that relates to the bandwidth required from the network. The Errored Cell Ratio (ECR) value is the ratio of the ATM cells in error to all the ATM cells sent during some interval. The remaining parameters are described later. Each application may have a maximum or minimum acceptable value for each parameter and a requested value for each parameter.

As previously indicated, ATM networks are implemented with switching nodes and communications links. The communications links typically have been based upon conventional telephony transmission systems and comprised fiber optic, microwave or wireline links. Fiber optic links transfer typically an error rate of $10^{-9}$; microwave and wireline connections, $10^{-7}$. More recently, communications links have begun to comprise terrestrial and satellite mobile wireless communications links and cable television systems. Each of these communications links are prone to introducing errors at significantly greater rates.

Some present ATM networks attempt to overcome such errors by implementing a transformation process in the form of a correction, or data manipulation, technique at each switching node on a "per-communications link" basis. That is, the network is designed such that certain links operate with a transforming process that is not alterable on a dynamic basis. For example, it is fairly common that satellite systems have a single error correcting code that operates over the entire bit stream passing over the link, notwithstanding the specific application. Using error correcting codes, such as forward error correction (FEC) codes, requires significant amounts of redundant information to be sent with each block of bits wherein a "block" may comprise a partial ATM cell, a single ATM cell or a plurality of ATM cells. This redundant information adds "overhead" to the transfer. This, in turn, reduces the bandwidth available for transporting an ATM cell. To be effective, an error correcting code must also match the anticipated error burst characteristics of the transmission system; systems that are subject to longer bursts require larger codewords or interleaving or both. Interleaving adds significant amounts of fixed delay to that already present in the transmission system. Such fixed delays manifest themselves, for example, as awkward conversation and user discomfort in a teleconferencing application or even as motion sickness and disorientation in a virtual reality application. Increasing bandwidth for error control between nodes is also expensive.

Error detecting codes are not presently used between nodes in ATM receiving networks. However, when error detecting codes are used in end systems, the receiving system will discard any ATM message or partial message that contains an error and will request the transmitting system to re-transmit that message. This is known as an "Automated Repeat reQuest" or "ARQ" process. However, when an error occurs in a sequence-preserving network, information transfers must be suspended until the lost ATM message can be re-transmitted and correctly received. This leads to delay variation in the end-to-end connection. The amount of delay variations is strongly affected by the fixed delay between the points that implement the ARQ process. By way of example, delay variations might manifest themselves as erratic motion of an image in live or stored video presentations.

As may now be evident, different applications can present unique sets of requirements and conditions for an accurate or error free transfer through the network. For example, a low quality video conference application may be far more tolerant of random errors than of long, fixed delays or delay variations. On the other hand, an entertainment video application may be insensitive to fixed delays, but severely affected by random errors and delay variations and be required to run without error correction. Users may also be sensitive to the cost of communications that generally increases for connections with increased bandwidth capabilities.

Looking at prior art ATM networks in greater detail, a calling end system initiates a transfer by issuing a call establishment message to the network, which then defines a network path to constitute a virtual connection from a calling end system to a called end system. The calling end system specifies the address of the called end system, the traffic contract and the quality of service requirements and other information for that virtual connection. This call establishment message is sent to a switching node serving the calling end system and then through each switching node in the virtual connection in sequence until the call establishment message reaches the called end system. This call establishment message also initializes the configuration of the switching nodes in the network path for the virtual connection as the message transfers to the called end system.

Each switching node updates actual values of parameters in the call establishment message by adding any impairments contributed by that node and outgoing communications link. If the requested path meets the necessary quality of service parameters in one switching node, the switching node sends the call establishment message to a succeeding switching node and establishes a set of conditions to be used at that switching node. If the requested path does not meet the quality of service requirements, the switching node returns a call release message through the virtual control path to the calling end system. If the quality of service requirements are met and the setup message reaches the called end system indicating that the entire virtual connection is acceptable, the called end system generates a call acceptance message that enables each switching node to establish the necessary operating conditions under which the call is transferred.

Approaches for accommodating different quality of service requirements on diverse communications links have been described in the following United States Letters Patent:

| | |
|---|---|
| 5,153,877 (1992) | Esaki et al. |
| 5,291,477 (1994) | Liew |
| 5,487,061 (1996) | Bray |

The Esaki et al. patent discloses a packet network that allocates communication resources to maintain qualities of service for different classes of requirements for quality of service. The system divides the communications resource into sub-resources that are allocated based upon the class of service. The Liew patent discloses a method and system for multicast routing in an ATM network that selects paths based upon traffic congestion. The Bray patent discloses a system and method for providing multiple loss and service priorities in which the quality of service parameters are loaded into the packet header so that error code processing can take place at a switch fabric and the unneeded error code discarded. Then additional information is reinserted into the error code field of the packet itself.

When delay variation is of primary concern, it has been suggested that elastic buffering be incorporated into such networks. Elastic buffering allows the incoming data to be buffered for a sufficient time to enable data synchronization to be resolved prior to the use of the message. However, the size of the buffers will depend on the data transfer rate and the time interval over which synchronization is to be assured. With video applications, such elastic buffers become very large. If a buffer is too small, data can be lost. Elastic buffering can also introduce high costs and high fixed delay.

Notwithstanding these suggestions, the general prior art approach remains. That is, a calling end system establishes a correction process for the entire virtual connection based upon a priori knowledge, which is sometimes not even available, in an attempt to match the quality of service requirements of a call to the overall characteristics of a virtual connection between the calling and called end systems. No attempt is made to alter the use of that code, once selected, on a link-by-link basis, notwithstanding the fact that this approach often introduces more errors than it might otherwise correct.

Assume, for example, an FEC technique is selected. This selection will be permanent and based upon the characteristics of the communications link and a designer's best estimate of the nature of the most likely applications to be conveyed over that link. Each message of ATM cells then is augmented by that error correcting code, thereby increasing the size of the application. The augmented message propagates through the path, even if the entire path comprises links, such as fiber optic links, that do not require such correction. In this example, the overhead introduced is unnecessary.

If some link in a path has a different error characteristic than that for which the overall error correcting scheme is defined, the error control scheme will either produce an unacceptable residual error rate, introduce overhead, or introduce different types of impairments into the system. Moreover, as previously indicated, when the ARQ correction process is utilized and invoked in an end-to-end system, the time required to re-transmit a message through the entire virtual connection can introduce unacceptable delays or delay variations.

Given projected demands on ATM networks, it is evident that these prior art approaches can limit transmissions, both artificially and needlessly. It would therefor be advantageous to provide another approach that would overcome the foregoing problems. More specifically, a method and process are needed for more closely matching the required characteristics of the ATM message and the characteristics of the requested data path on a link-by-link basis.

BRIEF DESCRIPTION OF THE DRAWINGS

FIGS. 6-1, 6-2 and 6-3 depict the operation of an egress processor in a switching node at the calling end of the network of FIG. 1.

DETAILED DESCRIPTION OF A PREFERRED EMBODIMENT

The present invention encompasses a method of and apparatus for implementing a switching network with a plurality of interconnected switching nodes and communications links. When a transfer is to be made between a calling end and a called end, a calling end system generates a call request. A switching node attached to that calling end system defines a network path to the calling end system and transfers a call establishment message to successive switching nodes over that network path for the virtual connection. At each switching node a selection of one call transforming process available at that node is made in response to the characteristics of an outgoing communications link to a succeeding switching node in the network path, the quality of service requirements for the virtual connection, and the expected effects of each transforming process on the ATM cells. The switching node also determines the expected quality of service from the calling end system to the succeeding switching node. If the defined network path for the virtual connection is capable of meeting the quality of service requirements, the switching node updates the expected quality of service and forwards the updated call establishment message to the succeeding switching node. Otherwise the switching node effects a release of the call over that virtual connection.

Figure 1:
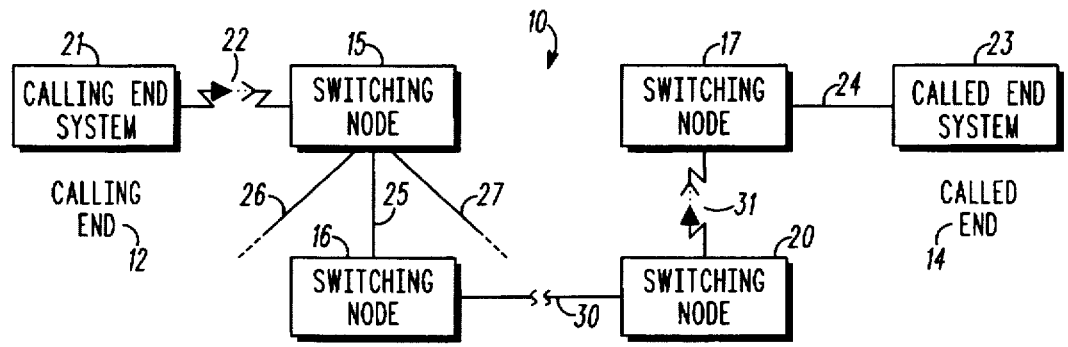
FIG. 1 is a block diagram depicting a typical ATM network that embodies this invention and that includes representative calling and called end systems, switching nodes and communications links.

FIG. 1 schematically depicts a typical ATM switching network 10 between a calling end 12 and a called end 14 that can incorporate this invention and that serves as a basis for establishing certain terms that are useful in understanding this invention. This particular switching network comprises a plurality of switching nodes, with switching nodes 15, 16, 17 and 20 being shown for purposes of this explanation, and a plurality of interconnecting communications links. A calling end system 21 connects to the network through a communications link 22 that attaches to the switching node 15. Similarly, a called end system 23 connects to the switching node 17 by means of a communications link 24.

Within the network, a communications link 25 interconnects the switching nodes 15 and 16. Additional communications links 26 and 27 represent connections to other switching nodes as are common in such networks. Only one communications link 30 is shown as connecting switching nodes 16 and 20, and only one communications link 31 is shown as connecting switching nodes 20 and 17. As known, multiple communications links could extend from any of these switching nodes to others. Other network paths could be established through other switching nodes not shown in FIG. 1. For purposes of understanding this invention, it will be assumed that the calling end system 21 issues a call request that addresses the called end system 23 and that the switching node 15 identifies a network path through the switching nodes 16, 20 and 17. This network path is assigned to the particular application making the call request and defines the virtual connection for that particular application.

The ATM network 10 can define a virtual connection comprising diverse communications links. For example, the communications link 22 could be a mobile wireless communications link; the communications link 25, a twisted pair or fiber optic transmission line. The communications link 30 represents other connections that could also include cable television systems and transmission lines. These connections could be direct connections to the switching node 20 or indirect connections through other intermediate switching nodes as might be incorporated in a particular network path. The communications link 31 could be another wireless communications link such as a satellite communications link, while the communications link 24 might be, e.g., a twisted pair or fiber optic transmission line. As known, each of these communications links has different characteristics with respect to the accuracy with which ATM cells transfer across the link.

Figure 2:
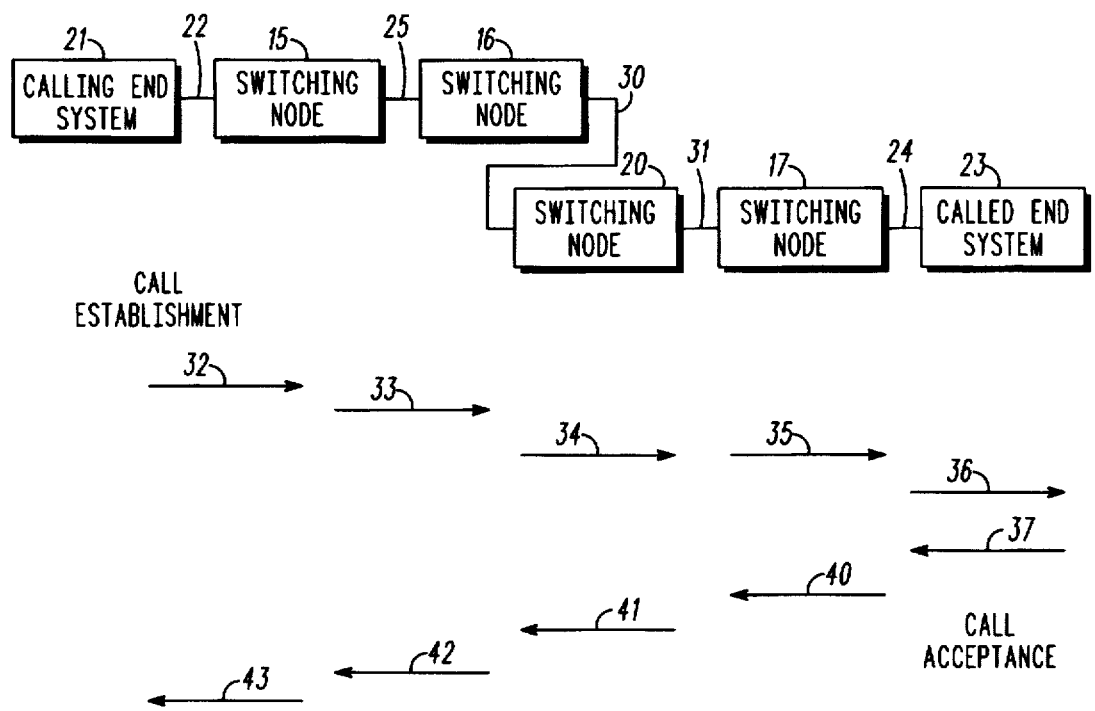
FIG. 2 depicts the flow of particular messages through the ATM network of FIG. 1 during the establishment of a connection.

As this invention operates in a basic ATM environment, it will also be helpful to review the basic operating sequence in which a calling end system, such as the calling end system 21, transfers a message (i.e., "calls" or makes a call) to the called end system 23. First the calling end system 21 generates a request that identifies the address of the called end system 23, various network requirements as are desired or necessary for a successful completion of the call and other information as known in the art. Referring to FIG. 2, the calling end system 21 uses this information to generate a call establishment message 32 (i.e., a SETUP or IAM message) that it transmits over the communications link 22 as an initial link into the network 10. The call establishment message 32 may include one or more ATM cells that collectively include, as one set of fields, Requested ECR and Maximum Acceptable ECR values or parameters for the particular application to be processed and a cumulative ECR field for accumulating expected ECR values. The cumulative ECR value will represent, at each switching node, the errored cell ratio expected to be introduced by transfers through previous links and switching nodes to that switching node. Similar fields generally will be provided for corresponding delay, delay variation and cell loss ratio parameters.

In addition the calling end system 21 will include an array of call transformation facilities for implementing various FEC, ARQ or other error correcting or data manipulation procedures or still other call transforming processes. The calling end system 21 uses the application requirements defined by the quality of service parameters and the characteristics of the communications link 22 to select a call transforming process, if needed, and to update the accumulated expected ECR, time delay and delay variation values that will result when a selected call transforming process is used. The updated call establishment message 32 also identifies the call transforming process being implemented. If expected values are within the desired ranges, the calling end system 21 transfers the updated call establishment message 32 to the switching node 15.

The circuitry in each of the switching nodes 15, 16, 20 and 17 in succession, and on a node-by-node basis, decodes the incoming call establishment message. For purposes of this example the switching node 15 decodes the incoming message 32, analyzes the information in that message 32 and determines whether the call should continue to be processed, the call transforming process that ought to be implemented given the quality of service requirements and the characteristics of the communications link 25. Then the switching node 15 generates an updated call establishment message 33, in the form of a SETUP or IAM message, that transfers over the communications link 25 to the switching node 16. In a similar fashion, the switching node 16 transmits an updated call establishment message 34 onto the communications link 30. The switching node 20 performs similar functions and generates another updated call establishment message 35 for transfer over the communications link 31. The switching node 17 responds by generating and transferring a final call establishment message 36 to the called end system 23 over the communications link 24. If the called end system 23 determines that it is willing to assent to the virtual connection with the quality of service requirements for the call, the called end system 23 generates a call acceptance message 37, such as a CONNECT message, onto the communications link 24 to the switching node 17 as an answer. Each of the remaining switching nodes in the network path for the virtual connection receives a CONNECT or ANswer message from the prior switching node and repeats that new call acceptance message to a succeeding switching node, these being represented as call acceptance messages 40 through 43 in FIG. 2. The receipt of a call acceptance message at each switching node enables that switching node to adapt to the needs of the call when the switching node is part of the virtual connection for that call. After the calling end system 21 receives a call acceptance message 43, the remainder of the ATM message transfer between the calling end system 21 and the called end system 23 can begin.

Should any of the switching nodes determine, when it receives a call establishment message, that the virtual connection being established cannot accommodate a particular application, that switching node terminates any further transfers of the call establishment message to a succeeding switching node. Then the switching node generates a call release message for immediate return through the proceeding switching nodes in the network path to the calling end system 21 for an appropriate action, as known in the art.

Figure 3:
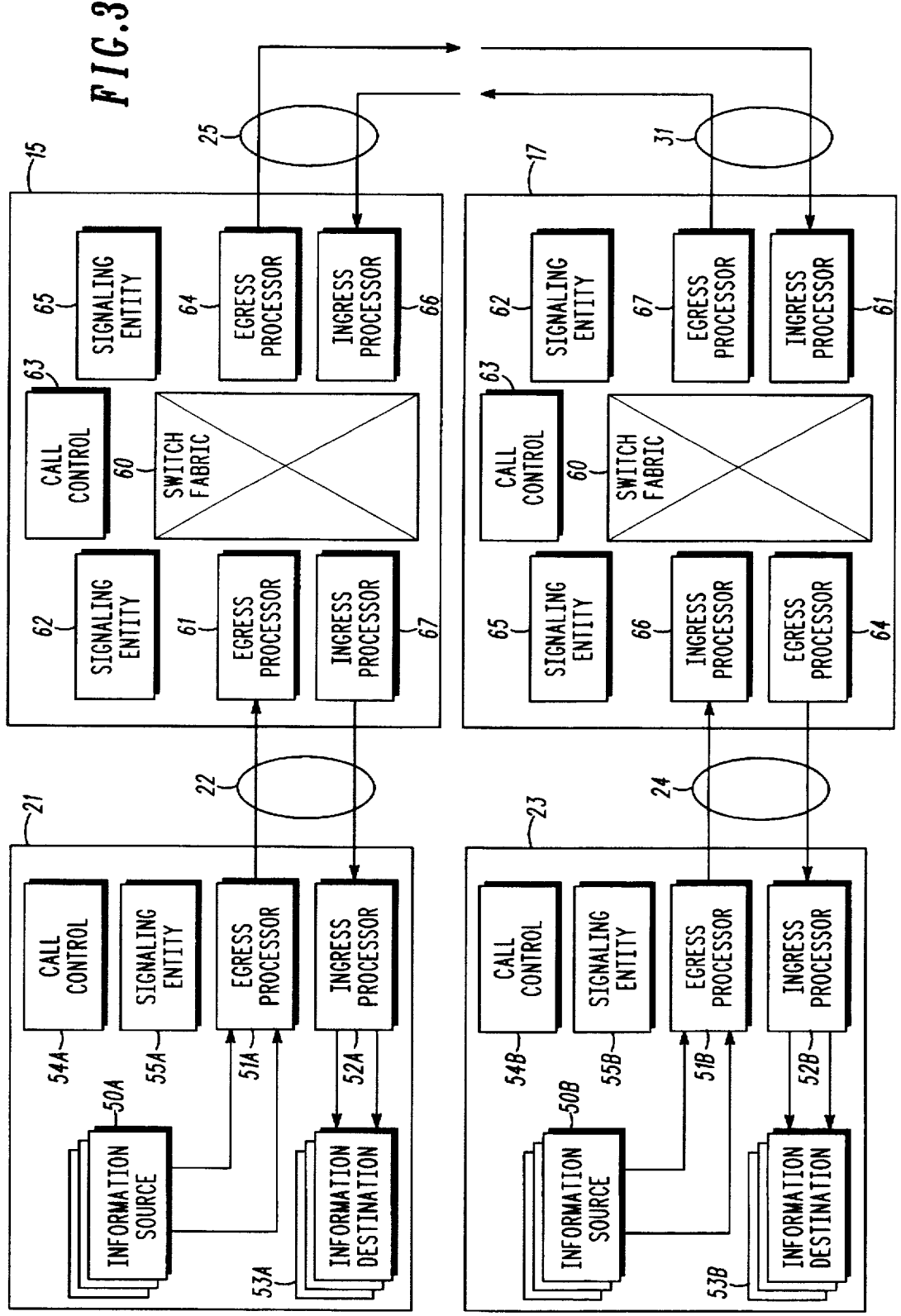
FIG. 3 is a detailed block diagram of portions of the network shown in FIG. 1.

FIG. 3 depicts different structures used at different sites within an ATM network incorporating this invention such that the network operates as described above with the added capability of matching error correcting or detecting or call transforming processes to the required quality of service parameters and characteristics of an individual communications link on a node-by-node or link-by-link basis. More specifically, FIG. 3 depicts details of the calling end system 21, the switching node 15, the switching node 17 and the called end system 23 together with the communications links 22, 25, 31 and 24. It should be noted that each of the omitted switching nodes 16 and 20 duplicate the structure shown in the switching nodes 15 and 17 and operate in the same manner.

Both the calling end system 21 and the called end system 23 are identical structurally, so the individual components are discussed with suffixes A and B assigned to the systems 21 and 23, respectively. Each of the calling and called end systems 21 and 23 includes an information source 50A and 50B. Egress processors 51A and 51B transfer the information from the sources 50A and 50B onto the communications links 22 and 24, respectively. Ingress processors 52A and 52B receive signals from the communications links 22 and 24 for transfer to information destinations 53A and 53B, respectively. Call control units 54A and 54B synchronize operations within the calling end system 21 and the called end system 23 while signaling entities 55A and 55B provide conventional signaling with respect to the transfer of information to and from the communications links 22 and 24, respectively.

In FIG. 3 the same reference numerals refer to identical components of each of the switching nodes 15 and 17. As known, the heart of any switching node in an ATM network is a switch fabric, such as a switch fabric 60. An ingress processor 61 in each of the switching nodes receives ATM cells that form part of the communication from a preceding system or switching node. For example, the ingress processors 61 in switching nodes 15 and 17 receive ATM cells from communications links 22 and 31, respectively. Each ingress processor 61 performs an error diagnosis. If any errors are detected, the ingress processor 61 may request re-transmission if ARQ is enabled or perform an error connection if enabled. A signaling entity 62 and call control unit 63 establish a path from the ingress processor 61 through the switch fabric 60 to an egress processor 64 for transfer of the ATM cell, onto a connected outgoing communications link.

During the processing of the call establishment message, a signaling entity 65 generates an updated call establishment message with updated status about the capability of the path to meet the quality of service requirements and transfers that new message through the egress processor 64 onto a communications link for transfer to a succeeding switching node. For example, the egress processors 64 in switching nodes 15 and 17 would transfer the ATM cells that form the call establishment message onto the communications links 25 and 24 while the egress processors 67 would transfer ATM cells onto the communications links 22 and 24 from the switching nodes 15 and 17, respectively.

Each ingress processor 66 and egress processor 67 and the egress processor 51B and ingress processor 52A are involved in the transfer of ATM cells back toward the calling end system 21. For example, the signaling entities 65 and call control units 63 in the switching nodes 15 and 17 transform the content of the call acceptance message to begin a process by which the signaling entity 62 constructs another call acceptance message. Thus, when the called end system 23 generates a call acceptance signal, the egress processors 51B and 61 and the ingress processors 66 and 52A transfer the call acceptance message to the calling end system 21 over the network path forming the virtual connection of FIG. 3.

As will now also be apparent, the egress processor 51A and ingress processor 52A form a single set in the calling end system 21. In a switching node, an ingress processor 61 and egress processor 67 constitute a set on one side of the switch fabric 60; an egress processor 64 and ingress processor 66, a set on the other side of the switch fabric 60.

Figure 4:
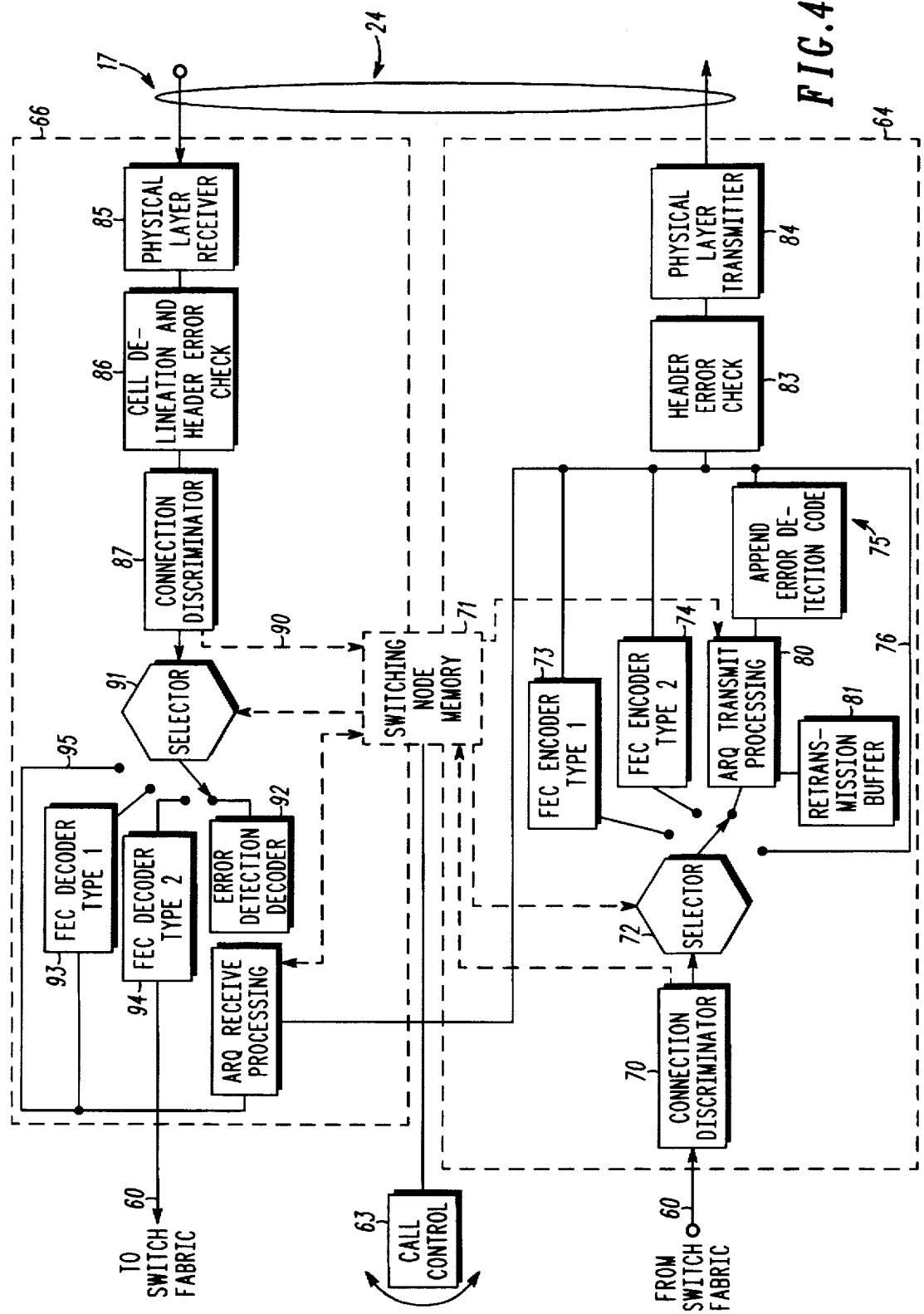
FIG. 4 is a more detailed diagram of portions of a single switching node, particularly an ingress processor and a corresponding egress processor shown in FIG. 3.

FIG. 4 is a more detailed block diagram of an embodiment of an egress processor and an ingress processor in a set as they are incorporated in the switching node 17 serving the calling end system 21. However, each egress and ingress processor in the calling end system 21, called end system 23 and switching nodes, such as the switching nodes 15 and 17 in FIG. 3, have identical structures. Using a set comprising the egress processor 64 and ingress processor 66 in the switching node 17 for explanation, connection discriminator 70 in the egress processor 64, as shown in FIG. 4, monitors incoming ATM cells from the switch fabric 60 and, from the header information in each ATM cell, enables the call control unit 63 to establish a path to direct appropriate ATM cells for a call establishment message into a per connection information storage portion of a switching node memory 71, as later described. The memory 71 also stores information about the communications link 24 generated when the network is initialized.

A selector 72 uses connection identifier information in the ATM cell header of a call establishment message as an index to extract, from the switching node memory 71, an index to one of a plurality or set of transformation processes or procedures. In this specific embodiment these processes are defined by a Type 1 FEC encoder path 73, Type 2 FEC encoder path 74, an ARQ transmit processing path 75 or a bypass path 76. The ARQ path includes an ARQ transmit processor 80, a re-transmission buffer 81 and an append error detection encoder 82. As known in the art, the incoming message will be stored in the re-transmission buffer 81 and the processor 80 and encoder 82 will transfer the message with an error detecting code appended onto the communications link 24. Each of the encoder paths 73 and 74 and the ARQ path 75 constitute means for performing a call transforming process that will modify a message that passes onto the communications link 24.

From the selected path, each ATM cell passes through a conventional header error check circuit 83. A physical layer transmitter 84 transfers the message onto the link 24. The structure and operation of these elements are known in the art.

Incoming data from the communications link 24 passes through a conventional physical layer receiver 85 in the ingress processor 66 and a cell delineation and header error check circuit 86 to be examined by a connection discriminator 87 to determine how the ATM cells received from the communications link 24 are to be processed, if at all. If they are, the connection discriminator 87 uses a virtual channel identifier in the ATM cell header to index into the switching node memory 71. In a preferred embodiment of the invention, an index is extracted from the appropriate storage location to enable a selector 91 to establish a path to the switch fabric 60 by which a selected one of the call transforming procedures, that complement those in the egress processor 64, operates on the ATM cells. In this embodiment, these include an ARQ decoding path 92, a Type 1 FEC decoding path 93, a Type 2 FEC decoding path 94 or a bypass path 95. The ATM cells then pass to the switch fabric 60.

Similar operations occur in each of the switching nodes in the network. Each egress processor receives ATM cells from a switch fabric and transfers ATM cells onto a communications link. Each ingress processor receives ATM cells from a communications link and transfers ATM cells to the switch fabric. At the called end system 23 in FIG. 3, the egress processor 51B and ingress processor receive signals from the information source 50B and communications link 24 and transmit signals to the communications link 24 and the information destination 53B, respectively.

Figure 5:
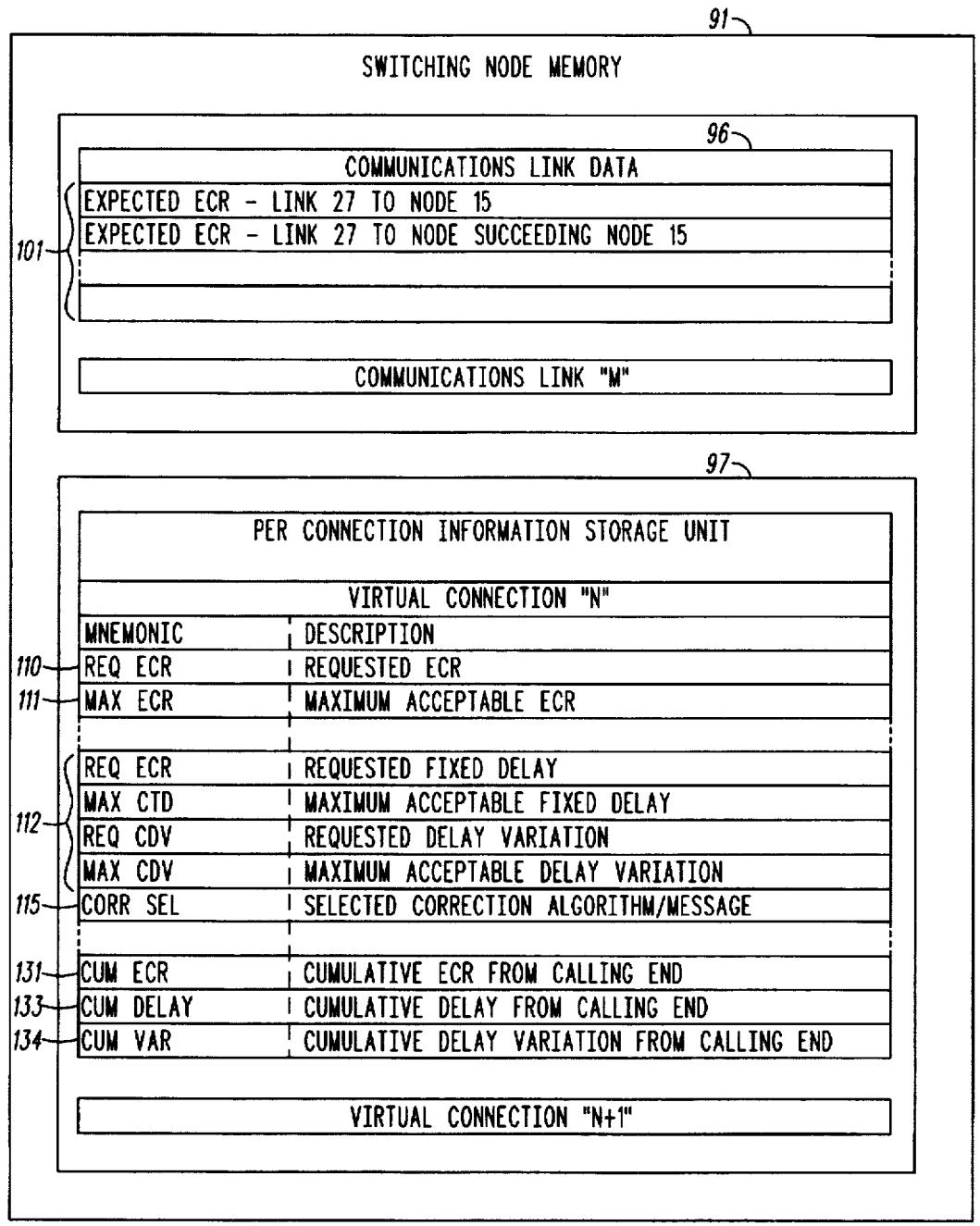
FIG. 5 depicts the organization of a switching node memory useful in the operation of the circuit in FIG. 4.

FIG. 5 depicts, in schematic form, the organization of the switching node memory 71 shown in FIG. 4. It comprises a communications link data section 96 for the communications link 24; other sections will exist for any other communications links connected to that switching node. A per connection information storage unit 97 contains information relative to each particular virtual connection, the data in a Virtual Connection "N" portion being shown in detail for the virtual connection shown in FIG. 3. The call control unit 63 transfers information about a connected communications link into a corresponding communications link memory section, such as section 96 for communications link 24 during network initialization in response to any network reconfiguration.

Figure 6A:
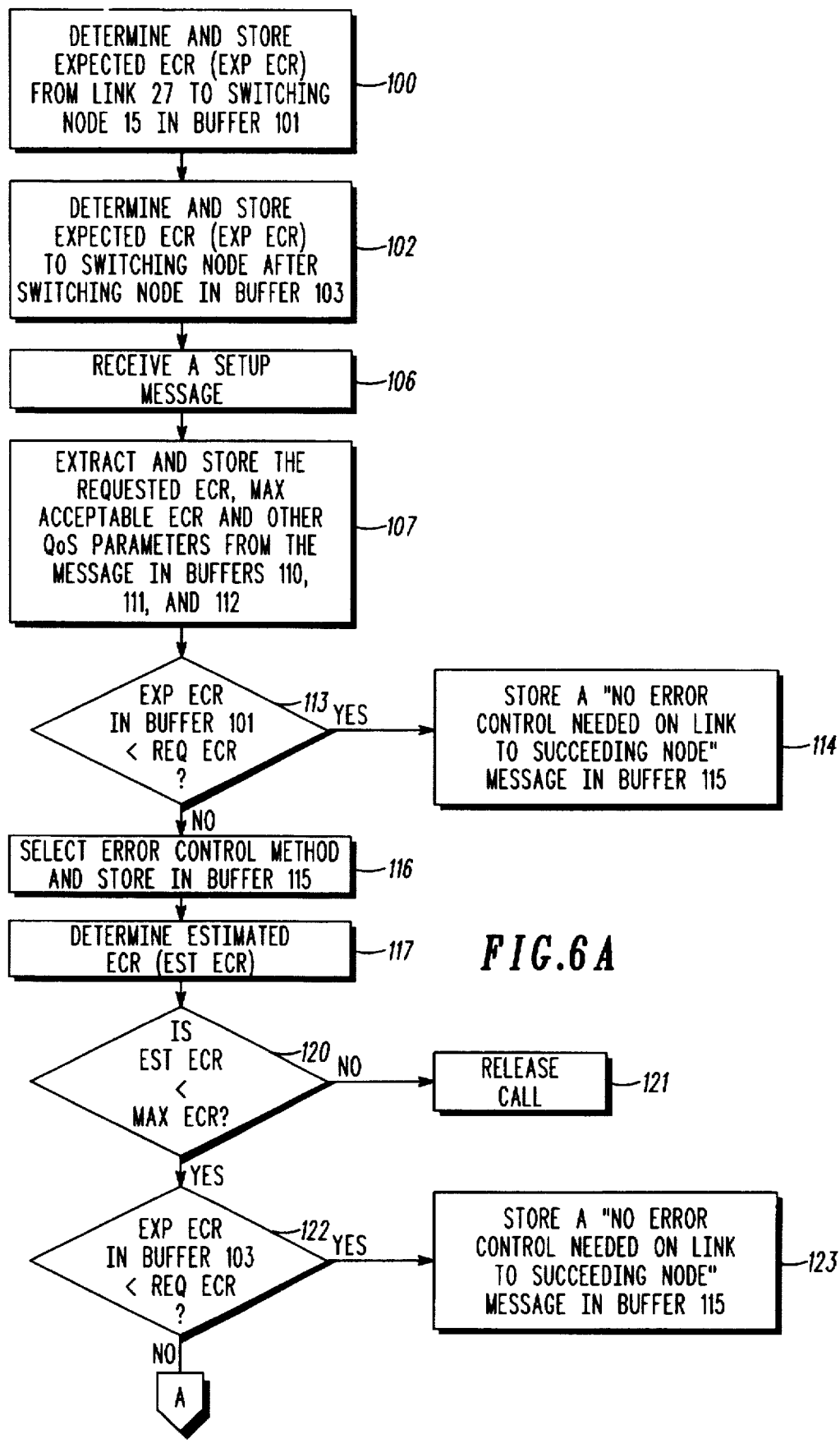
Figure 6B:
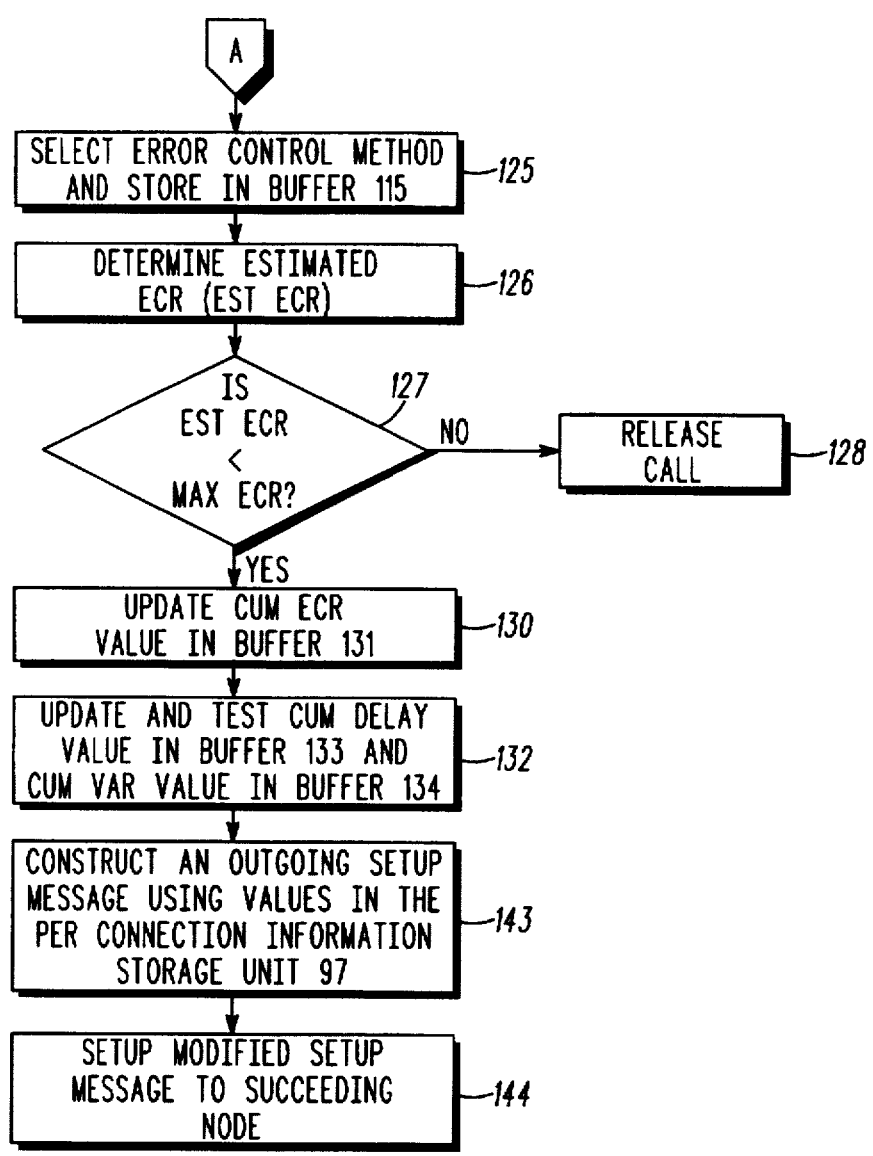
Figure 6C:
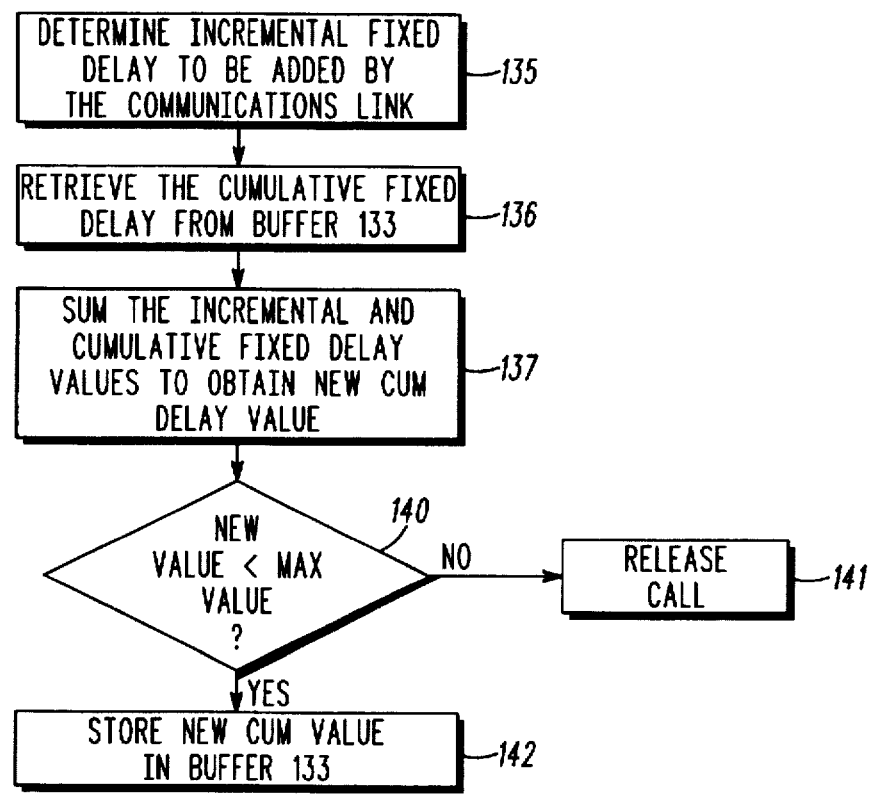

FIGS. 6-1 through 6-3 depict the operations at the switching node 15 serving the calling end system 21 during connection establishment. Step 100 in FIG. 6-1 represents the process by which the call control unit 63 in FIG. 4 stores the expected ECR value for the communications link 22 to the calling end system 21 in a buffer 101. Step 102 represents the determination of the expected ECR of the communications link 25 to a next switching node and storage of that value in a buffer 103. These steps, as previously indicated, are performed in initialization or reconfiguration.

Still referring to FIGS. 4 and 5 and to step 106 in FIG. 6-1, an ATM call establishment message, denoted as a SETUP message in the figure, arrives from the egress processor 51A over the communications link 22 and transfers through the ingress processor 61 to the signaling entity 62. In step 107 the call control unit 63 extracts the Requested ECR, the Maximum Acceptable ECR and other quality of service parameters for storage in buffers 110, 111 and 112 of a portion of the per connection information storage unit 97 of FIG. 5 assigned to the virtual connection. Other quality of service parameters include maximum delay and maximum delay variation values.

In step 113 the call control unit 63 begins a procedure for determining whether a virtual connection can be established based upon characteristics of the communications links 22 and 25. The call control unit 63 compares the value of the Requested ECR in buffer 110 with the value of expected ECR for the communications link 22 stored in buffer 101. If the value in buffer 101 is less than the value in the buffer 110, the link 22 will not impose undue errors. Consequently, step 113 diverts to step 114 that stores in a CORR SEL buffer 115 of FIG. 5 an indication that no error control is needed for the link 22 to the switching node 15. This enables the selector 72 in FIG. 4 to connect to the bypass path 76. If, however, the value in the buffer 101 is not less than the Requested ECR value, step 113 diverts to step 116 to select a call transforming process that most favorably, or best, satisfies all the quality of service requirements for the virtual connection.

In step 116 the call control unit 63 examines the effect of the different available corrections or call transforming processes and utilizes the information in the buffer 112 concerning the delays and delay information to select a process that best matches the quality of service requirements for the virtual connection to the capabilities of the communications link 22. Methods for making such determinations are well within the knowledge of persons of ordinary skill in the art. When this determination is completed, step 117 determines the estimated ECR that will result when the egress processor 51A implements the selected call transforming process. If step 120 determines that this estimated ECR with the error control will not be less than the Maximum Acceptable ECR stored in the buffer 111, control diverts to step 121 and the call is released.

If the estimated ECR in buffer 104 is less than a Maximum Acceptable ECR, step 120 diverts to step 122 where the call control unit 63 begins a procedure to determine whether the network path to the succeeding node over the communications link 25 for the virtual connection will support the quality of service requirements. Specifically the call control unit 63 determines whether the estimated ECR value from step 117 is less than the value of expected ECR in buffer 103. If it is, no error control is needed on the communications link 25 to the succeeding switching node. Step 123 stores a corresponding indication in buffer 115. Otherwise step 122 diverts to step 125 in FIG. 6-2 that again attempts to establish an error control or call transforming process. Like the process used in step 117, step 126 determines the estimated ECR with a call transforming process. Step 127 diverts to step 128 to release the call if the estimated ECR of step 120 stored in the buffer 111 will not be less than the Maximum Acceptable ECR value. If the value for the estimated ECR is less than the value of the Maximum Acceptable ECR, step 127 diverts to step 130 that updates cumulative ECR value stored in the buffer 131 shown in FIG. 5.

Step 132 represents procedures by which the call control unit 63 in FIG. 4 updates and tests the values in a CUM DELAY buffer 133 and a CUM VAR buffer 134 of FIG. 5. FIG. 63 depicts the procedure for updating and testing the cumulative fixed delay value as an example. In step 135 the call control unit 63 determines the incremental fixed delay to be incurred during the transfer over the proceeding and succeeding communications links 22 and 25. Generally this incremental fixed delay will have a value equal to the propagation delay through those links as in prior art networks, or zero if no correction is to be used. Otherwise it will be some finite value that is the sum of the propagation delay and correction procedure. The call control unit 63 then retrieves the cumulative fixed delay, (such as delays due to interleaving) incurred by using the selected value in step 136 and sums that value and the incremental fixed delay value in step 137. If the total value exceeds the value in the maximum acceptable fixed delay value in the quality of service buffer 112, step 140 diverts to step 141 to release the call. Otherwise, step 140 diverts to step 142 to store the new value in the buffer 133 for transfer to the next switching mode.

This procedure repeats for the delay variation parameter. That is, the call control unit 63 determines the incremental delay variation to be added by any selected call transforming process and adds or convolves this value to the value in the buffer 134. If the resulting delay exceeds the maximum acceptable delay variation value in the buffer 112, the call control unit 63 releases the call. Otherwise, the call control unit 63 stores the updated delay variation represented by the sum into the buffer 134.

Referring again to FIG. 6-2, when the procedures of step 132 complete without releasing the call, the call control unit 63 uses step 143 to construct an outgoing or updated call establishment or setup message using the information in the per connection information storage unit 97. The method of FIGS. 6-1 through 6-3 terminates in step 144 of FIG. 6-2 with the transfer of the updated call establishment message to a succeeding switching node over the communications link 25.

Figure 7:
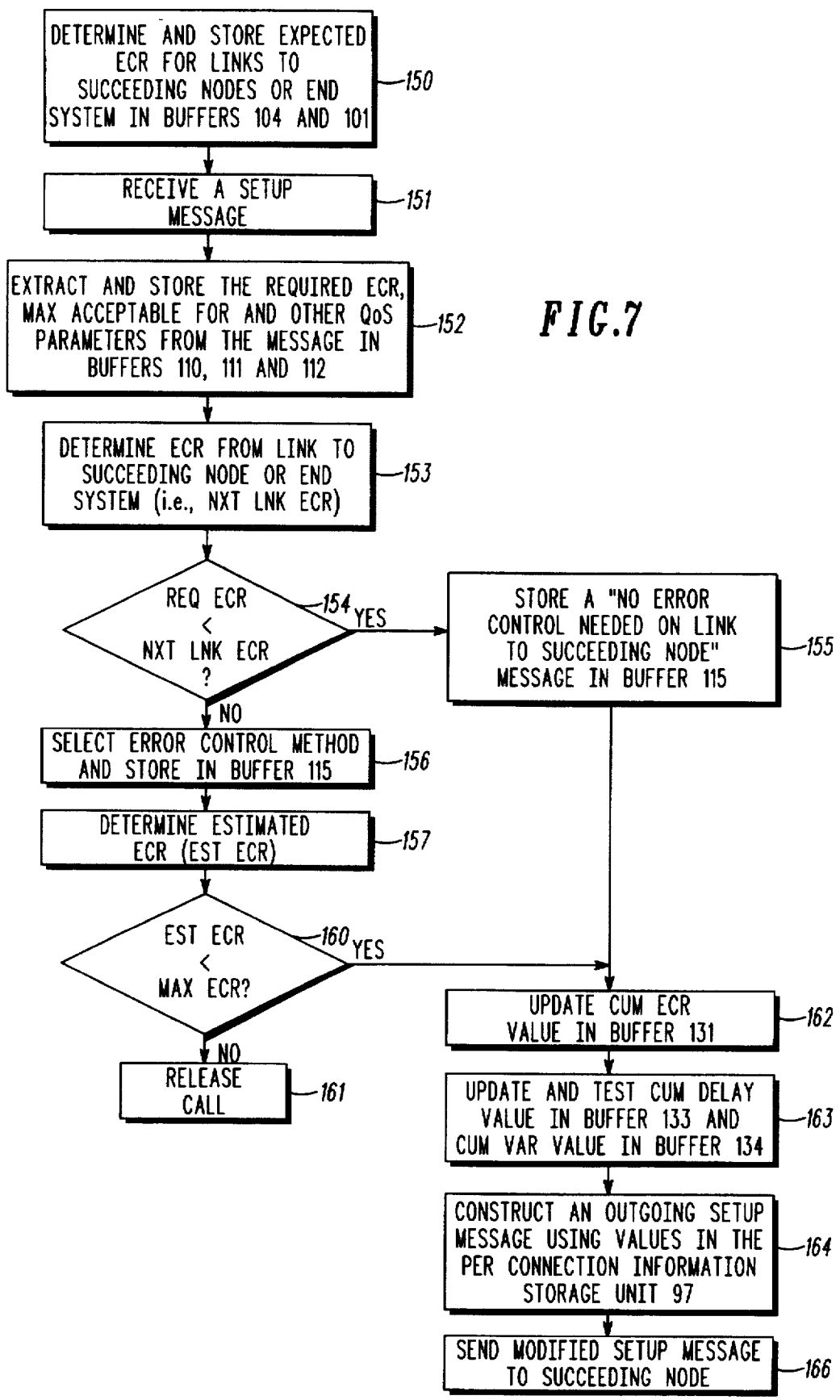
FIG. 7 depicts the operation of an egress processor at other switching nodes and at the called end system of FIG. 1.

FIG. 7 depicts the operation that occurs at each of the other switching nodes in the virtual connection and in the called end system 23 in FIGS. 1 and 3. Looking at FIG. 7 in terms of the operation of the egress processor 64 of switching node 17 in FIG. 3, and egress processor 51A of the calling end system 21, the initialization procedure in step 150 stores the values for the expected ECR for the link to a succeeding node or to the called end system 31, in a location corresponding to the buffer 101 in FIG. 5. After each egress processor 64 or 51A receives a call establishment message, shown as a SETUP message in step 151, a call control unit 63 or 54A uses step 152 in FIG. 7 to respond by extracting the REQ ECR, MAX ECR and QoS parameters and storing the values in buffers corresponding to the buffers 110, 111 and 112 as shown in FIG. 5. Step 153 determines whether the value for the expected ECR for the link to the succeeding node or called end system 22 as stored in the corresponding communications link memory 96 is less than the value for the requested ECR in buffer 110. If it is, no correction control is necessary, so step 154 branches to step 155 that stores a message in a buffer corresponding to buffer 115 assigned to the virtual connection. Otherwise step 156 selects an appropriate error control or call transforming process based upon the quality of service requirement being requested for the virtual connection, the characteristics of the link over which the ATM cells will be transmitted, and the expected effects each transformation process will have on the virtual connection given the characteristics of the communications link. Step 156 also stores the identification of the selected error control method in the buffer 115 shown in FIG. 5. If the estimated ECR with the selected error control will not be less than the maximum acceptable ECR stored in buffer 111 as determined by step 157, step 160 diverts to step 161 to release the call.

If no correction will be necessary or the correction will be successful, steps 155 and 160 shift control to step 162 whereupon the call control unit 63 will update the cumulative ECR in step 162. Step 163 calls a procedure for updating and testing to CUM DELAY and CUM VAR values using the same procedure as in FIG. 6-3. Step 162 updates the cumulative value in a buffer corresponding to the CUM ECR buffer 131. Step 164 represents the construction of the updated call establishment message that will include the updated cumulative ECR, delay and delay variation information and the selected correction process identification. When this has been completed, step 166 enables the modified setup message to transfer through the header error check circuit 83 and the physical layer transmitter 84 shown in FIG. 4 onto the communications link 27 for switching node 15.

Figure 8:
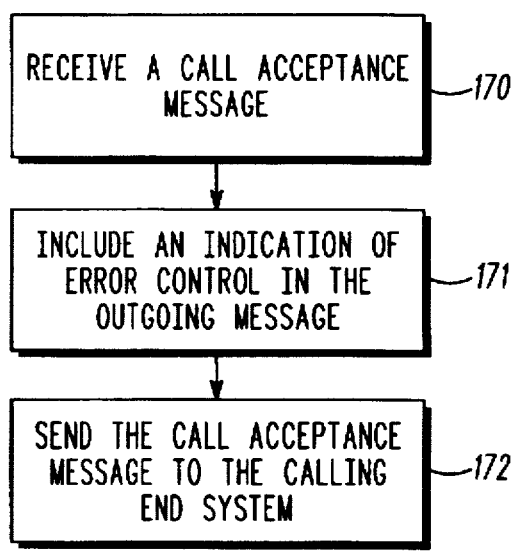
FIG. 8 depicts the operation of an ingress processor of FIG. 4.

When the called end system 23 receives the call establishment message, it determines whether the entire virtual connection will be supported by the selected path. If it will, the called end system sends a call acceptance message; otherwise it sends a call release message. Generally speaking, when a switching node receives either message, the corresponding ingress processor transfers the call acceptance or call release message to the switch fabric so that the egress processor can transfer the call acceptance or call release message toward the calling end system. Referring now to FIG. 8, when the ingress processor at the switching node serving the calling end system receives a call acceptance message, its call control unit receive (170) the message and extracts (171) the information from the CORR SEL buffer 115 shown in FIG. 5. The call control unit loads that information into a call acceptance message, which is sent (172) to the ingress processor at the calling end to enable the corresponding egress processor to implement the appropriate transformation process during subsequent transfers over the virtual connection.

As will now be apparent, unlike prior art systems that select a correcting procedure based upon the overall characteristics of a virtual connection, decisions in an ATM network incorporating this invention are made on a node-by-node or link-by-link basis. Each egress processor can optimize the transmission to a succeeding node by comparing the characteristics of a link to the succeeding node and the quality of service requirements to determine which, if any, correction or call transforming process might be implemented. These procedures constitute a negotiation wherein two entities (i.e., a first switching node and either another switching node or an end system) determine whether correction control ought to be used for a particular virtual connection over a single link. As previously indicated, prior art end-to-end error control negotiation occur in ignorance of the error characteristics of individual links that carry the connection. This invention overcomes the problems associated with such approaches by eliminating the unnecessary inclusion of correction procedures at sites that do not require such procedures and optimizes any correction procedures that might be needed.

Moreover, and referring again to FIG. 4, as the ARQ procedure is implemented at each switching node, the detection of an error occurring at a subsequent node produces an immediate request for re-transmission by re-transmitting the appropriate ATM cells from the re-transmission buffer 81. This allows the ARQ transmission procedure to be implemented between successive switching nodes and eliminates the prior art delay corresponding to the interval required to transfer the message back to the calling end before the re-transmission can occur.

In summary, like the prior art, an ATM network incorporating this invention responds to a call request from a calling end system by establishing a virtual connection for the transfer of the ATM cells for an application in two phases. In a first, or call establishment, phase the calling end system initiates a process by which a virtual connection is established through different communications links and interconnecting switching nodes for a particular application. Then the calling end system generates a call establishment message that defines quality of service requirements including ECR, fixed time delay, time delay variation and other requirements that are dependent upon the application. The call establishment message generally transfers through the path to the calling end system.

Unlike the prior art, a switching node incorporating this invention has the capability of performing one or more call transforming processes during the second phase. During the first phase, the switching node uses stored transfer characteristics of the communications link over which the ATM cells will pass in the second phase, the quality of service requirements extracted from the received call establishment message and the effect each call transforming process will have on the ATM cells to select one such process. The selection can also include a decision to bypass any such process. The switching node also generates an updated call establishment message for transfer to a succeeding node.

Each switching node also extracts the identification of the call transforming process that a preceding switching node has utilized. The updated call establishment message contains a cumulative expected effect of any preceding switching nodes and communications link on the message and the identification of the call transforming process the switching node will implement. Each switching node additionally stores the results in a per connection storage system as a provisional set of setup parameters for the virtual connection.

In a preferred embodiment, each switching node repeats this process. If any switching node determines that a cumulative effect precludes the virtual connection from carrying the application, that switching node returns a call release message. If the virtual connection can accommodate the quality of service requirements to the called end system, a call acceptance message returns along the path. Each switching node utilizes that call acceptance message to confirm the provisional settings and establish conditions by which the application ATM cells will be transferred for that virtual connection on a link-by-link basis.

Thereafter the second or active phase begins during which the ATM cells of the actual application pass through the virtual connection with appropriate call transforming processes being utilized at each individual switching node for transfer to a succeeding node. The effects and operation of the network can be appreciated by referring to a particular type of communications link and the handling of different applications over that link. For example, if a communications link is a mobile wireless connection, the egress processor might select a first forward error correcting code with minimal level of interleaving for teleconferencing applications to minimize the ECR and fixed delays. For a virtual connection for transferring stored video, a second forward error correcting code with significant interleaving might be used to minimize ECR and variable delays at the expense of incurring greater fixed time delays. If, however, an application were involved in initial communications with the Internet, the selection of ARQ call transforming might be appropriate.

If the communications link included a geosynchronous satellite, the teleconferencing application might utilize another third forward error correcting code with an intermediate level of interleaving to transfer the application ATM cells to the succeeding switching node. A fourth forward error correcting code with still another level of interleaving might then be used with stored video applications. An ARQ call transforming process might still be used for the Internet application.

In the particular virtual connection of FIG. 1, only the calling end system 21 and the switching node 20 would introduce any overhead into the message and only between each of those systems and nodes and their succeeding nodes.

Unlike the prior art where such overhead would effect the operation of each switching node and communications link, this invention eliminates the overhead in communications links, such as communications links 25 and 24 and their corresponding switching nodes 15 and 17. As switching nodes generally connect to multiple communications links, this elimination of unnecessary overhead increases the capability of the switching node to accommodate other virtual connections concurrently.

Moreover, at each switching node, the selection of a particular call transforming process is made with full knowledge of the application and the characteristics of a communications link and switching node. This eliminates problems that can occur in prior art systems when the requirements for a particular application differ from the predetermined quality of service set forth by the particular error correcting code or the like. If an ARQ call transforming process is selected, then the network incorporating the present invention merely re-transmits a message between two successive nodes upon detecting an error and does not have to re-transmit the ATM cells from the calling end system to the called end system. Consequently the implementation of ARQ in accordance with this invention does not introduce the excessive delay variations like those that occur in prior art networks.

It should be noted that the present invention has been described in terms of a particular embodiment. The quality of service requirements, for example, have been defined as including ECR, fixed delay and delay variation and cell loss ratio parameters. Other parameters, such as costs, could also be added. These parameters would be processed in the same fashion as fixed delay and delay variation parameters. A number of alternative implementations can be made. For example, steps 114 and 123 in FIG. 6-1 depict a process by which the selection of a call transforming process can be passed to a succeeding switching mode. Alternate message forms and processes could be substituted. Specific organizations of the communications link data storage unit 96 and per connection information storage unit 97 are shown in FIG. 5. The switching node memory 71 could be altered by the addition of other storage locations for other information by organizing the storage locations differently.

What is claimed is:

1. A method for operating a switching network that includes a plurality of switching nodes that each include a plurality of communications links connected thereto, for supporting a call between a calling end system and a called end system, via a virtual connection along a network path, wherein the virtual connection is characterized by quality of service requirements and wherein the plurality of communications links has a corresponding transfer characteristic, said method comprising the steps of:

identifying the virtual connection to produce an identified virtual connection;

storing, at those switching nodes in the identified virtual connection, the corresponding transfer characteristic for those of the plurality of communications links connected thereto;

generating a call establishment message containing a first quality of service requirement for a call;

selecting, at those switching nodes in the identified virtual connection, a call transforming process that favorably matches the first quality of service requirement and the stored corresponding transfer characteristics; and using the selected call transforming process to transform message signals associated with the call.

2. A method as recited in claim 1, further comprising the step of determining, at each of the switching nodes in the identified virtual connection, the effect of the selected call transforming process on the identified virtual connection.

3. A method as recited in claim 2, further comprising the step of generating an updated call establishment message that includes a cumulative effect on the identified virtual connection.

4. A method as recited in claim 3, further comprising the step of incorporating, in the updated call establishment message, an identification of the selected call transforming process.

5. A method as recited in claim 1, wherein each message signal comprises at least one cell and the corresponding communications link transfer characteristics reflect an anticipated errored cell ratio (ECR), wherein the first quality of service requirement is a requested ECR and wherein said step of selecting comprises the step of:

comparing the anticipated ECR with the requested ECR.

6. A method as recited in claim 5, wherein a second quality of service requirement is a maximum acceptable ECR that is greater than the requested ECR, further comprising the steps of:

testing each call transforming process to determine an estimated ECR; and releasing the call when the estimated ECR is not less than the maximum acceptable ECR.

7. A method as recited in claim 5, wherein said step of using the selected call transforming process includes storing a forward error correction process.

8. A method as recited in claim 5, wherein said step of using the selected call transforming process includes storing a plurality of forward error correction processes.

9. A method as recited in claim 5, wherein said step of using the selected call transforming process includes storing an error detection process that produces an automated repeat request.

10. A switching node that includes a plurality of communications links connected thereto for supporting a virtual connection through a network path to a called end system in response to a call request at a calling end system, wherein the virtual connection is characterized by a quality of service requirement, wherein each of the plurality communications link has a corresponding transfer characteristic and wherein each call request produces a call establishment message for being transferred toward the called end system, the switching node comprising:
   A) first means for storing the corresponding transfer characteristics;
   B) second means for transforming message signals passing to an outgoing communications link;
   C) third means for extracting, from the call establishment message, the quality of service requirement; and
   D) fourth means, responsive to said first and third means, for selectively enabling said second means to perform a call transforming process that favorably matches the quality of service requirement, the corresponding transfer characteristic of the outgoing communications link and an expected effect of the call transforming process.

11. A switching node as recited in claim 10, wherein said second means further comprises means for storing a plurality of call transforming processes and said fourth means includes means for determining, for each call transforming process, the effect thereof on the virtual connection.

12. A switching node as recited in claim 11, further comprising fifth means for generating an updated call establishment message that includes a cumulative effect of selected call transforming processes on the virtual connection.

13. A switching node as recited in claim 12, wherein said fifth means includes means for incorporating, in the updated call establishment message, a selected call transforming process identification.

14. A switching node as recited in claim 10, wherein the corresponding communications link transfer characteristic comprises an anticipated errored cell ratio (ECR) of a number of cells in error to a total number of cells in a message, wherein the quality of service requirement is a requested ECR and wherein said fourth means includes means for selecting a call transforming process based upon a comparison of the anticipated ECR and the requested ECR.

15. A switching node as recited in claim 14, wherein a second quality of service requirement is a maximum acceptable ECR that is greater than the requested ECR and wherein said fourth means includes means for testing each call transforming process to determine an estimated ECR for the communications link, further comprising means for releasing the message when the estimated ECR is not less than the maximum acceptable ECR.

16. A switching node as recited in claim 14, wherein said second means comprises means for storing a forward error correction process.

17. A switching node as recited in claim 14, wherein said second means comprises means for storing a first and a second forward error correction process.

18. A switching node as recited in claim 14, wherein said second means comprises means for storing an error detection process that produces an automated repeat request.

19. An ATM network device for transferring ATM cells with a quality of service requirement in response to a call establishment message from a calling end system to a called end system over a virtual connection formed by a network path with switching nodes and communications links connected thereto, each communications link having a link transfer characteristic that affects an accuracy with which the ATM cells can be successfully transferred over that communications link, the ATM network comprising:
   A) a buffer that stores;
      A1) the link transfer characteristics for those communications links included in the virtual connection; and
      A2) the quality of service requirement for the ATM cells; and
   B) a signal processor connected to each of the communications links included in the virtual connection, the signal processor comprising:
      B1) a plurality of call transforming processors;
      B2) a selector, responsive to the link transfer characteristics and the quality of service requirement, that selects, from the plurality of call transforming processors, a selected call transforming process that favorably matches the quality of service requirement and the link transfer characteristics, and
   C) a switch fabric, operably coupled to the signal processor and the buffer.

20. An ATM network device as recited in claim 19, wherein one of the call transforming processors comprises a bypass path means for transferring the ATM cells without transformation.

21. An ATM network device as recited in claim 19, wherein the signal processor comprises a header error check circuit and a physical layer transmitter for transferring ATM cells onto a connected communications link.

22. An ATM network device as recited in claim 19, wherein the plurality of call transforming processors includes a forward error correction encoding means for encoding ATM cells, an automated request error detecting means for enabling a re-transmission of ATM cells upon detection of an error by a succeeding node in the network path, and a bypass path means for directing ATM cells toward the switch fabric without modification.

23. An ATM network device as recited in claim 22, wherein the call establishment message includes the quality of service requirement and an expected quality of service from the virtual connection, further comprising call control means for determining whether the expected quality of service for the virtual connection exceed the quality of service requirement.

24. An ATM network device as recited in claim 22, further comprising:
   D) ingress processing means for transferring ATM cells from an incoming communications link to the switch fabric, said ingress processing means including:
      D1) means for extracting from the call establishment message an identification of the selected call transforming process; and
      D2) means for selecting a complementary call transforming process that complements the identified call transforming process.

25. An ATM switching node for use in a network in which communications links having predetermined transmission characteristics interconnect a plurality of such ATM switching nodes and in which a calling end system and a called end system connect to first and second of the ATM switching nodes, whereby the calling end system can establish a virtual connection through a network path in the ATM network for an information transfer having quality of service requirements, the ATM switching node comprises:

A) an egress processor and an ingress processor connected to a first and second of the communications links, respectively, said egress processor including means for transferring the information over the first communications link to the ingress processor and the ingress processor including means for receiving information from the egress processor, A1) said egress processor having a plurality of correction means having different capabilities for transforming information transferred onto the first communications link and means for selecting one of the correction means in response to the predetermined transmission characteristics, quality of service requirements and correction means capabilities, and A2) said ingress processor having a plurality of processing means for processing received transformed information from the second communications link and means for selecting one of the processing means in response to the selection of said correction means by the egress processor, and B) switch fabric coupled to the egress and ingress processors, thereby enabling the transfer of information between said egress and ingress processors, whereby a call establishment message sent from the calling end system causes the egress processor and the ingress processor to select one of the plurality of correction means and corresponding processing means, respectively, according to a favorable match among the transmission characteristics, quality of service requirement and the correction means capabilities.

26. An ATM switching node as recited in claim 25, wherein said plurality of correction means in said egress processor includes a plurality of encoding paths, and said plurality of processing means includes corresponding sets of decoding paths that correspond to said plurality of encoding paths, said egress processor being adapted for encoding messages from said switch fabric for transfer onto a first communications link and said ingress processor being adapted for decoding messages from the first communications link for transfer to said switch fabric, whereby the switching node can select which, if any, of the plurality of encoding paths and corresponding decoding paths are to be selected.

* * * * *